A. E. CHODZKO.
PROCESS OF AND APPARATUS FOR MAKING PULP VESSELS.
APPLICATION FILED JULY 26, 1916.

1,264,365.

Patented Apr. 30, 1918.
12 SHEETS—SHEET 4.

Inventor,
A. E. Chodzko,
per F. M. Wright
Attorney

A. E. CHODZKO.
PROCESS OF AND APPARATUS FOR MAKING PULP VESSELS.
APPLICATION FILED JULY 26, 1916.

1,264,365. Patented Apr. 30, 1918.
12 SHEETS—SHEET 5.

Inventor,
A. E. Chodzko,
per
Attorney

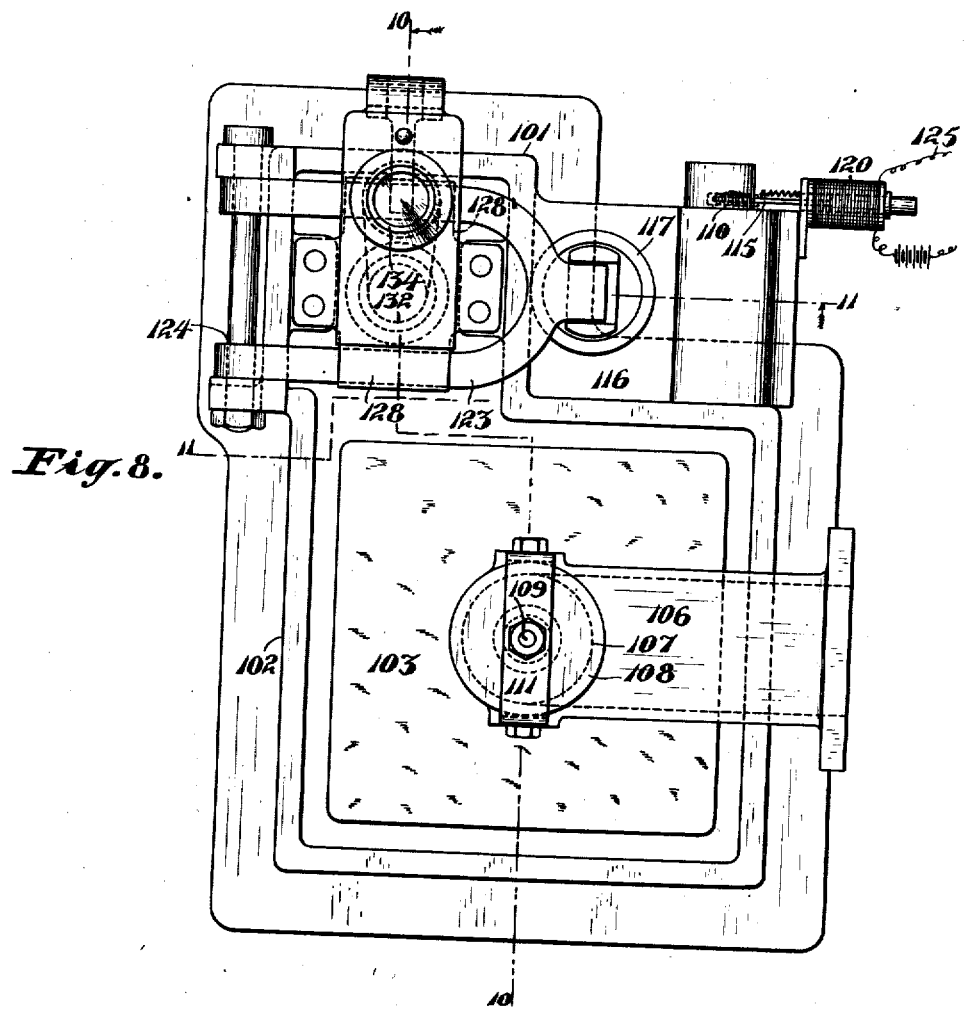

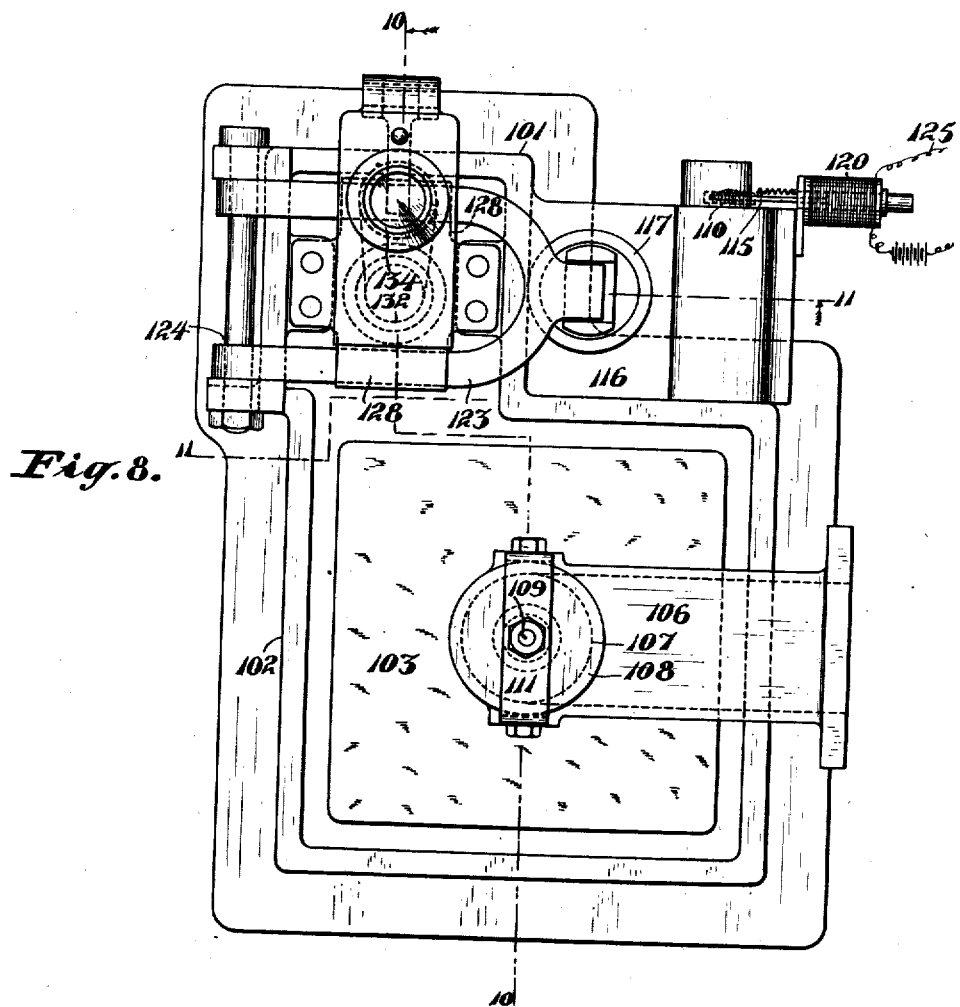

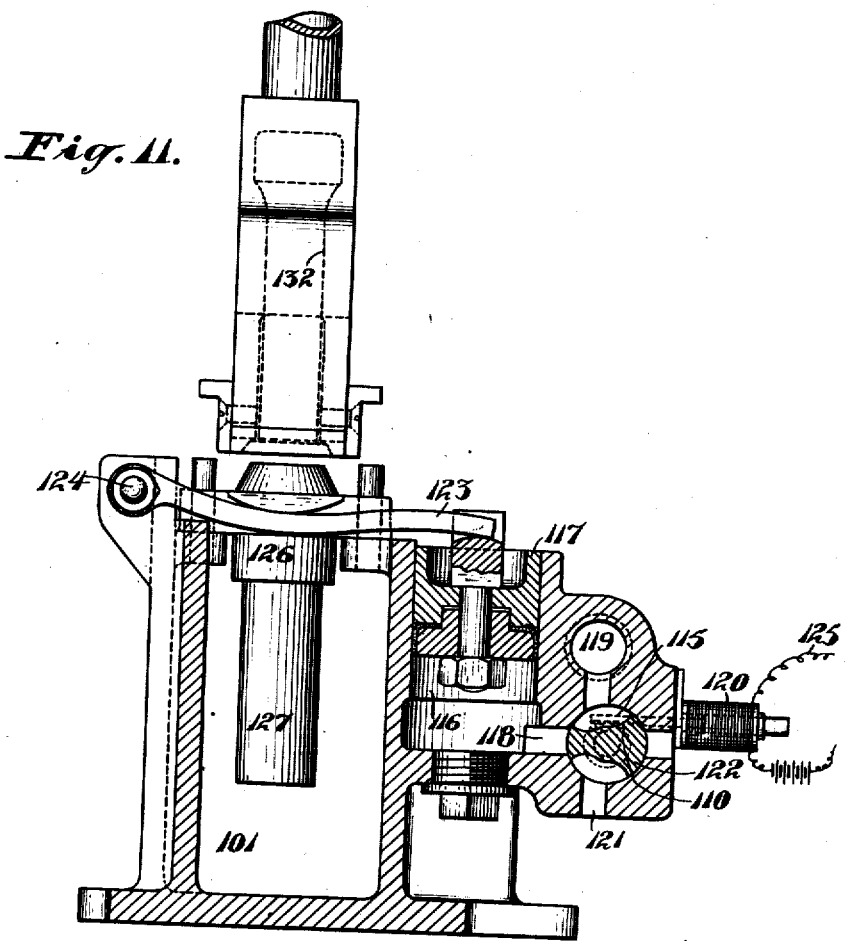

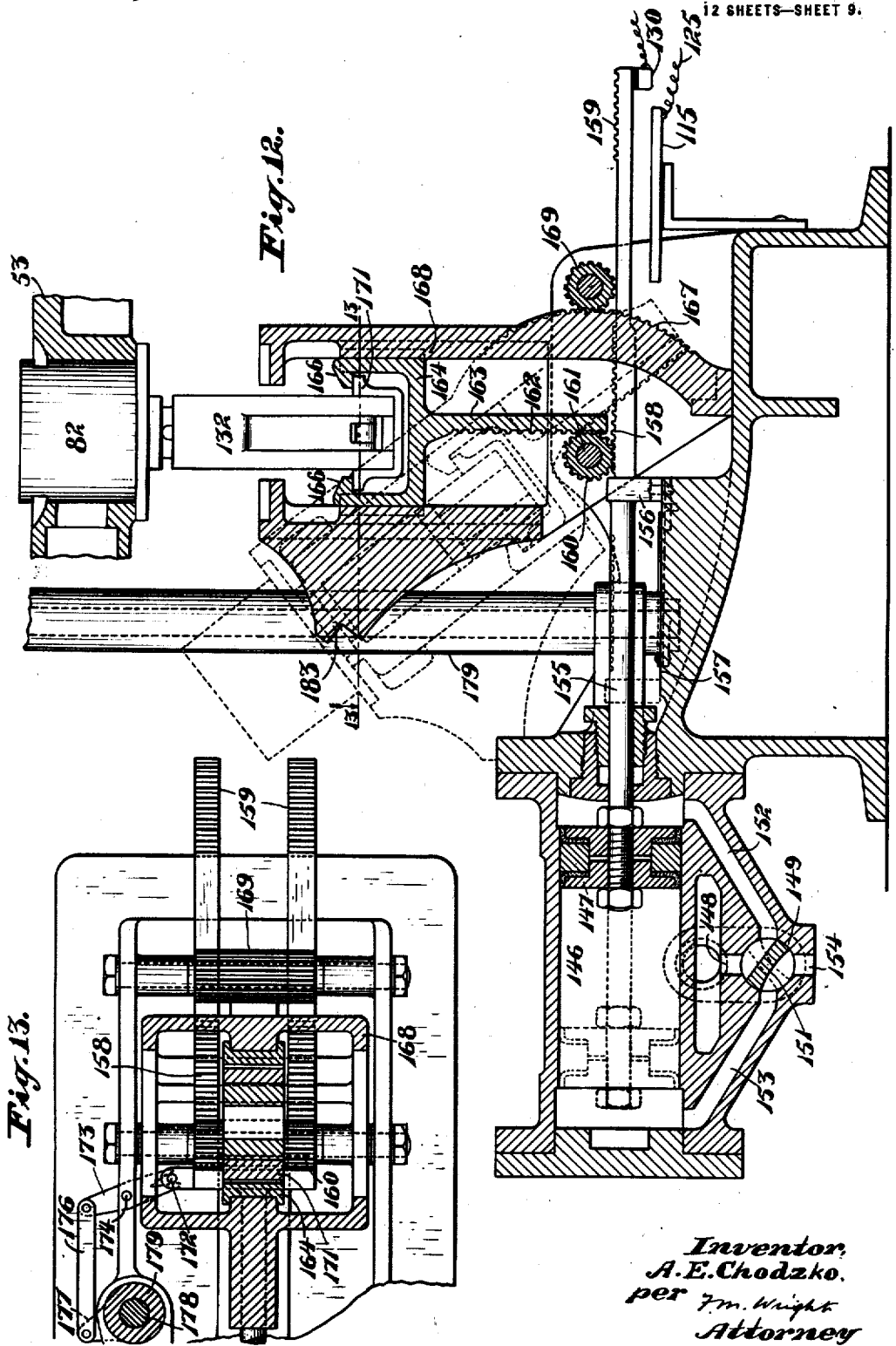

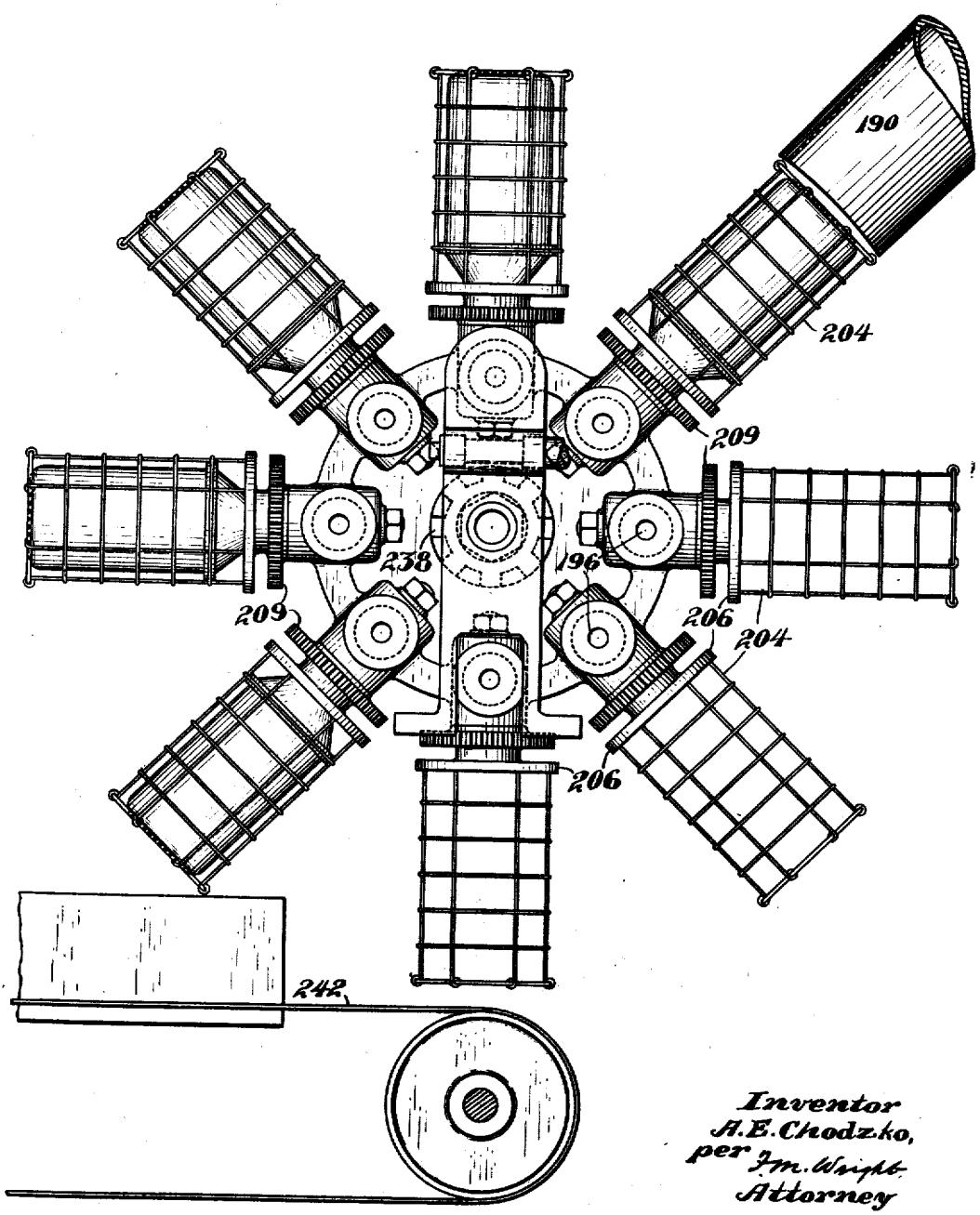

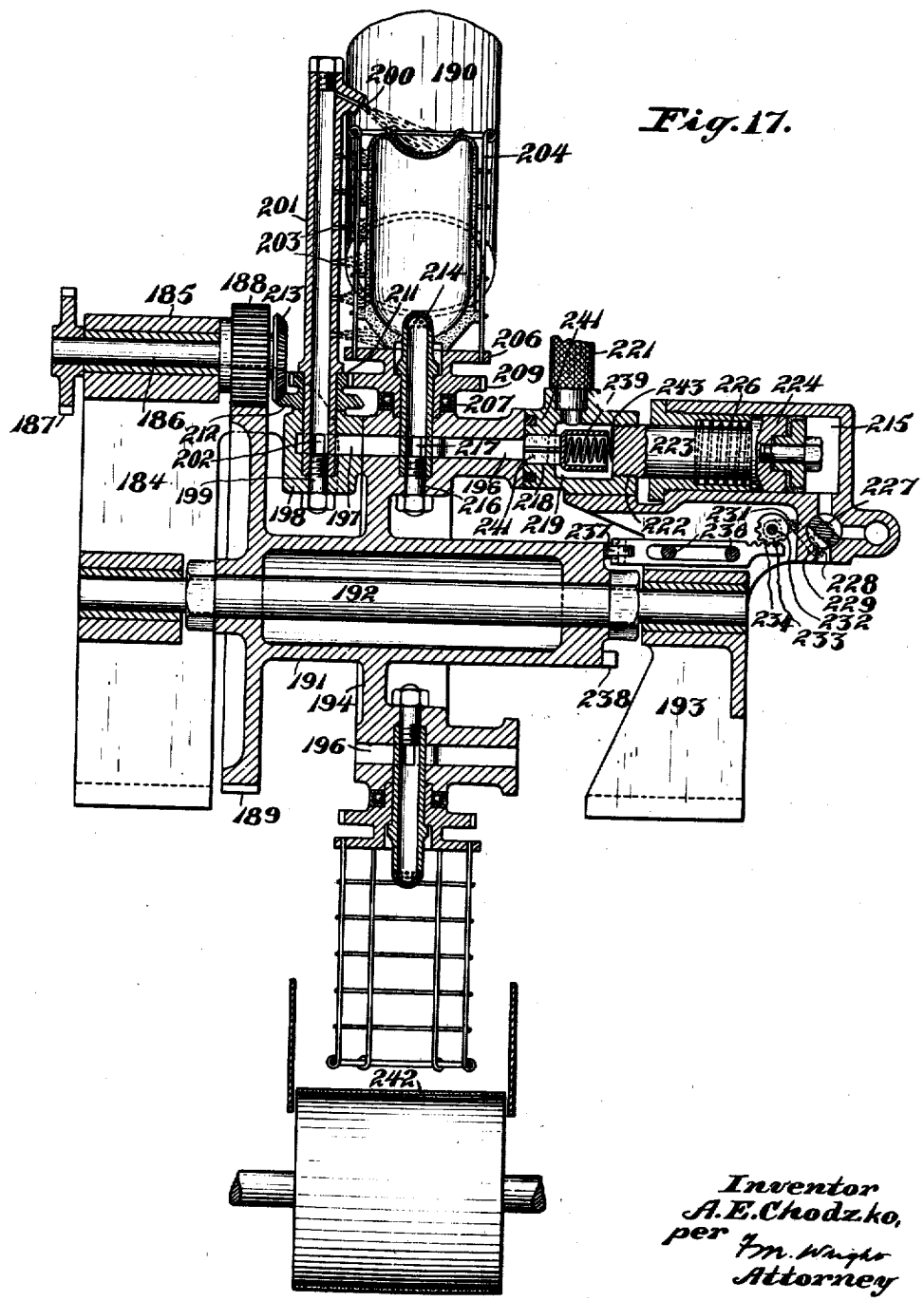

UNITED STATES PATENT OFFICE.

ADAM E. CHODZKO, OF SAN FRANCISCO, CALIFORNIA, ASSIGNOR OF ONE-HALF TO LOUIS BAZET, OF SAN FRANCISCO, CALIFORNIA.

PROCESS OF AND APPARATUS FOR MAKING PULP VESSELS.

1,264,365.  Specification of Letters Patent.  Patented Apr. 30, 1918.

Application filed July 26, 1916. Serial No. 111,428.

*To all whom it may concern:*

Be it known that I, ADAM E. CHODZKO, a citizen of the United States, residing at San Francisco, in the county of San Francisco and State of California, have invented new and useful Improvements in Processes of and Apparatus for Making Pulp Vessels, of which the following is a specification.

The object of the present invention is to provide an improved process of, and apparatus for, making pulp vessels, and especially milk bottles, in a single piece.

Figure 1:
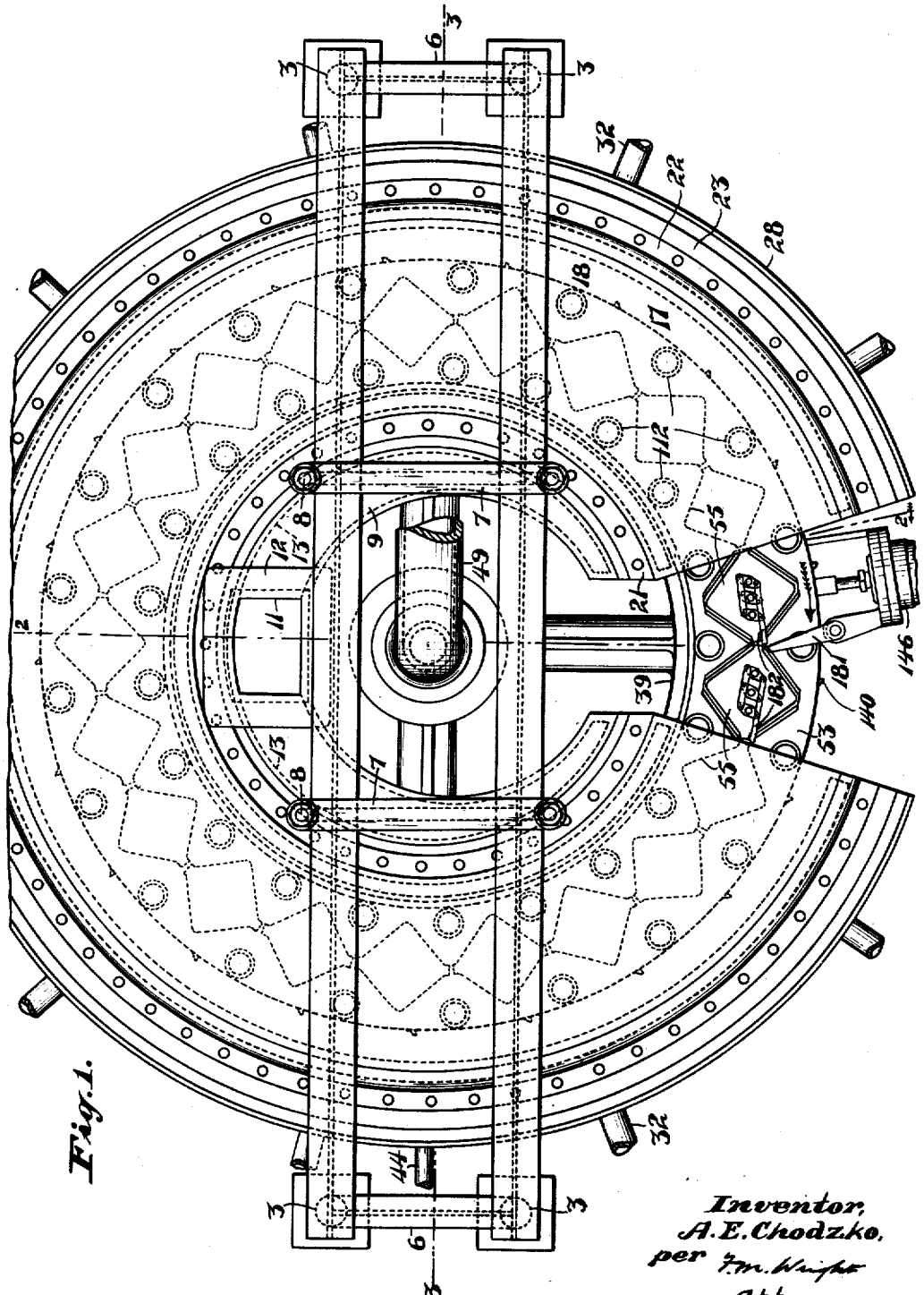
Figure 2:
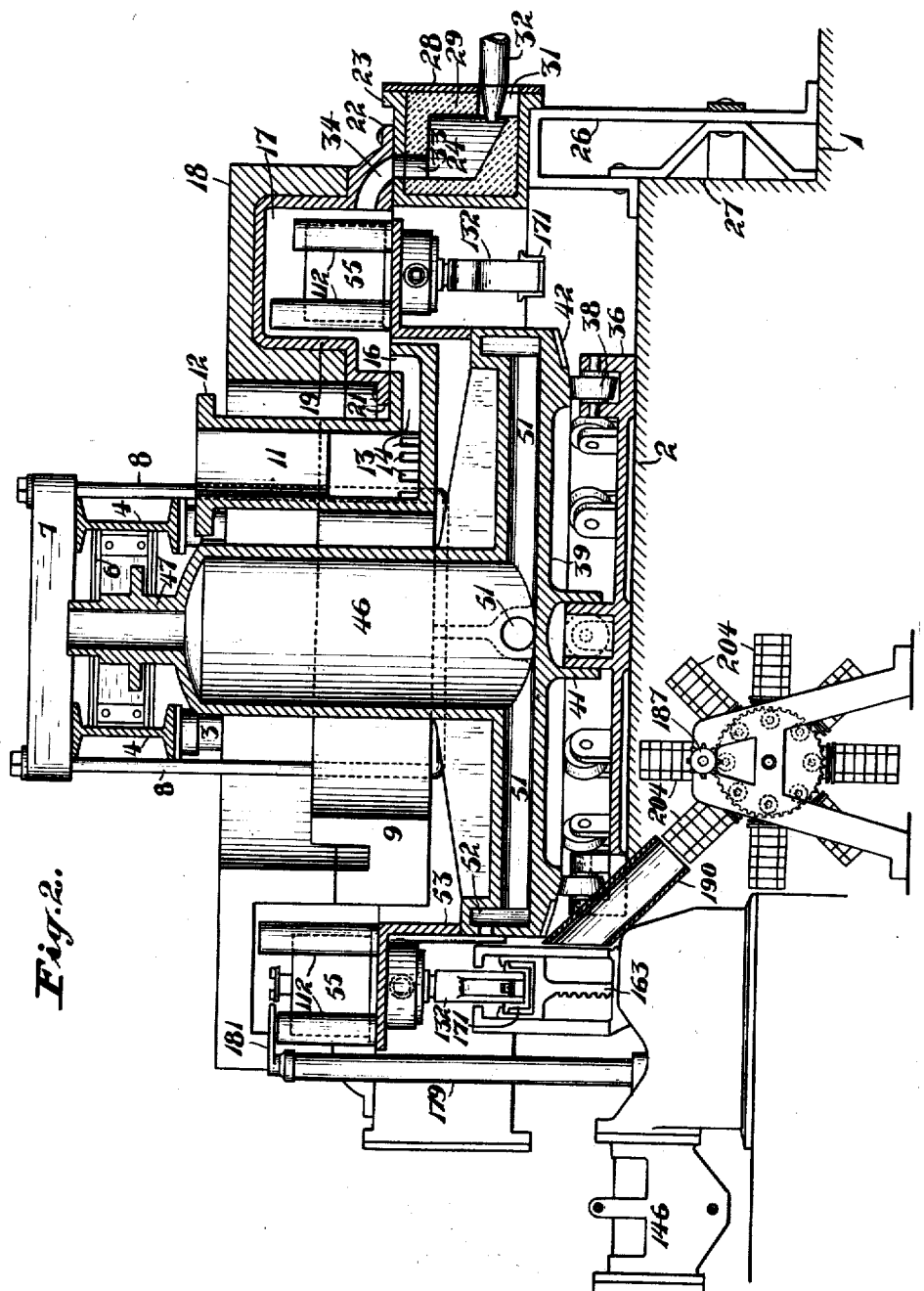
Figure 3:
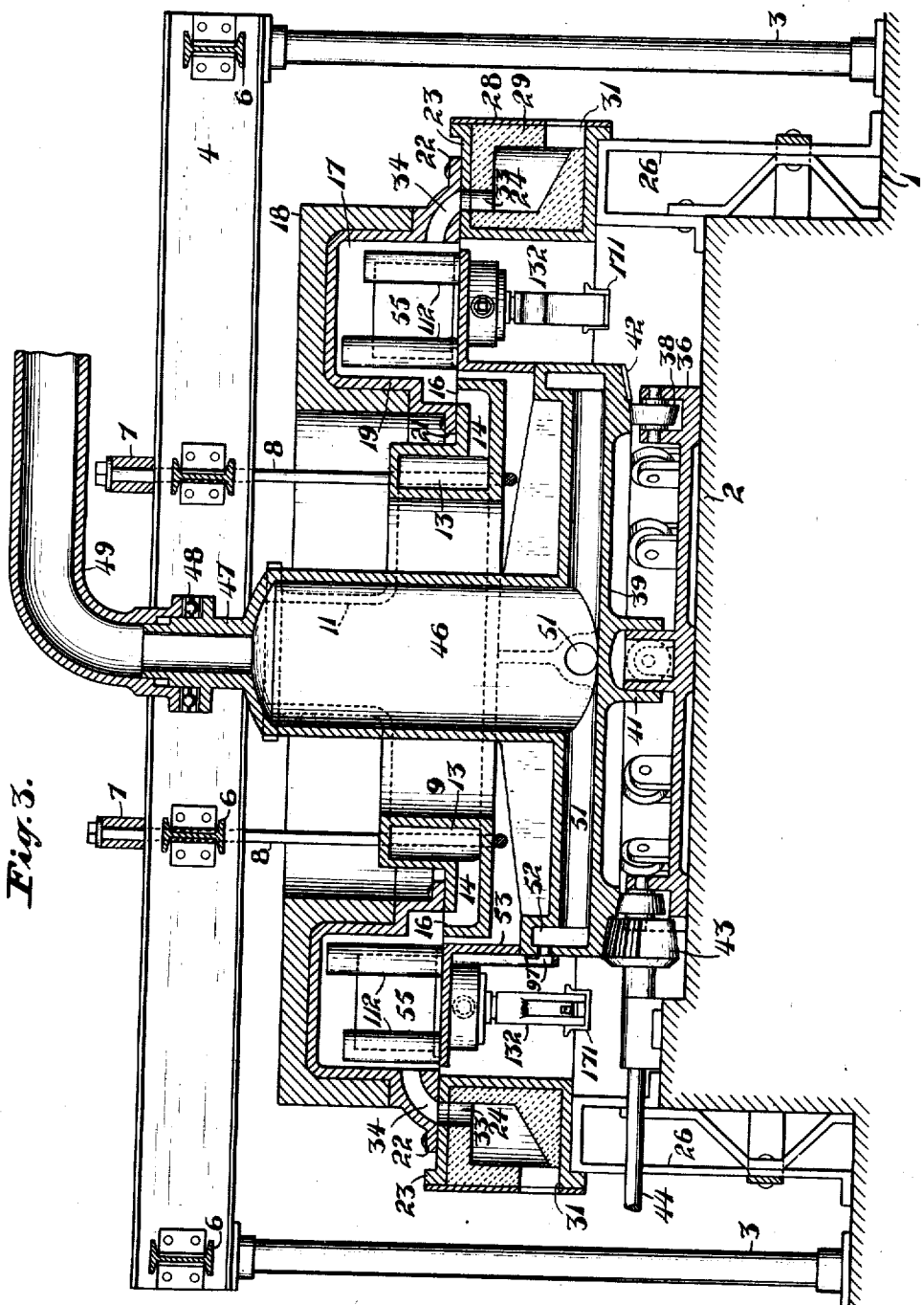
Figure 4:
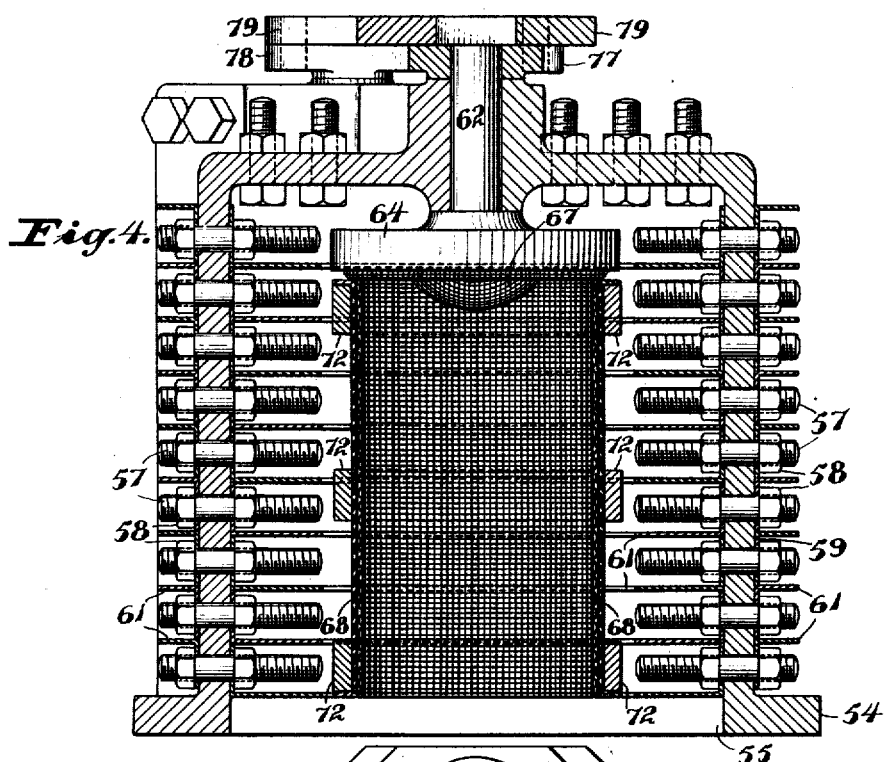
Figure 5:
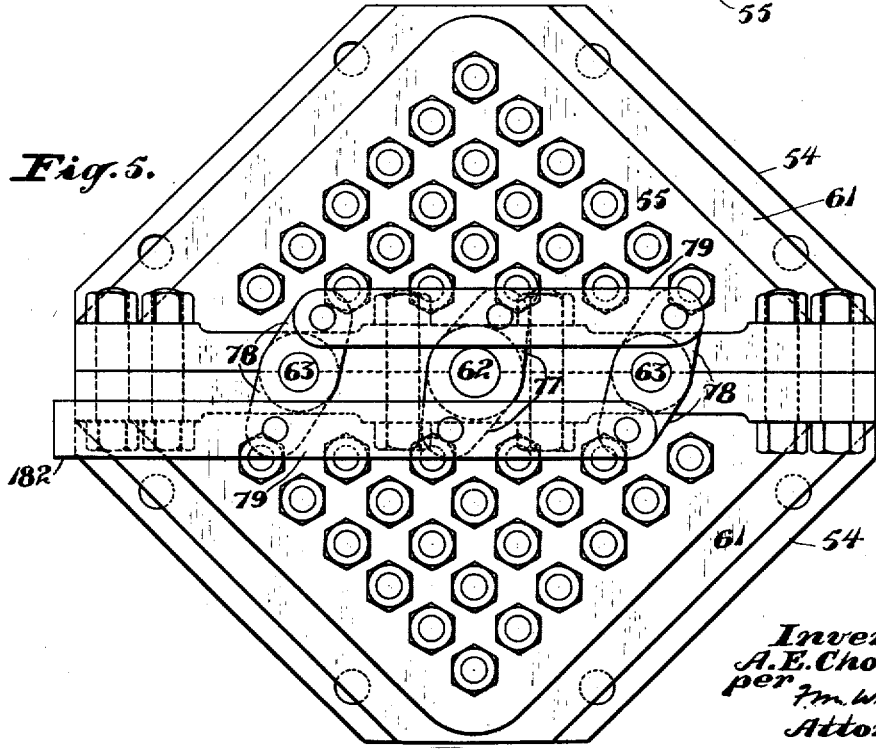
Figure 6:
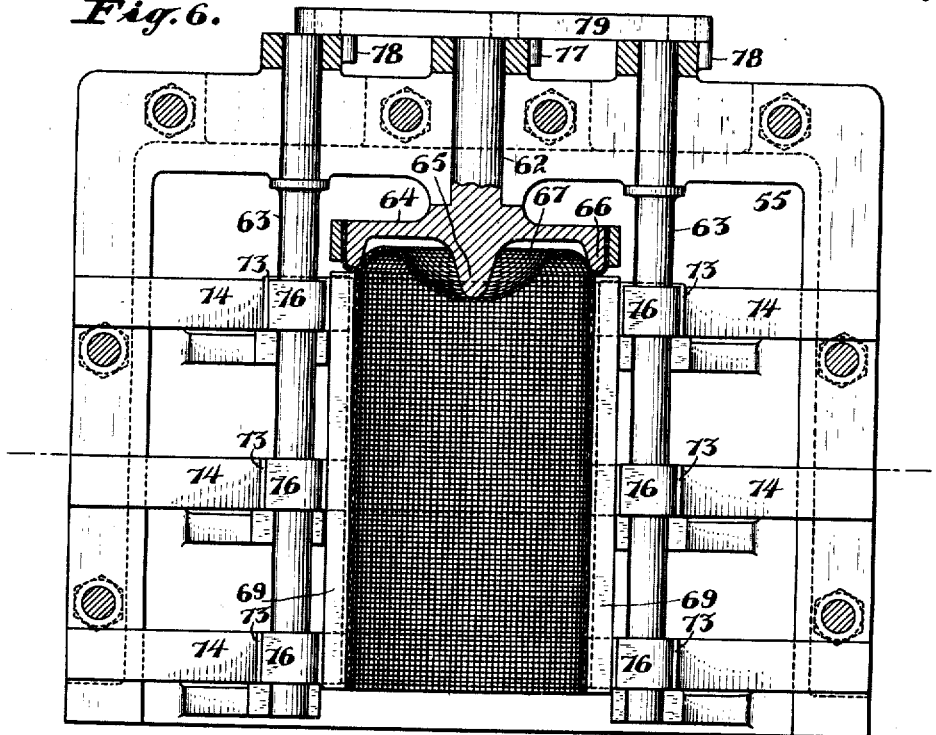
Figure 7:
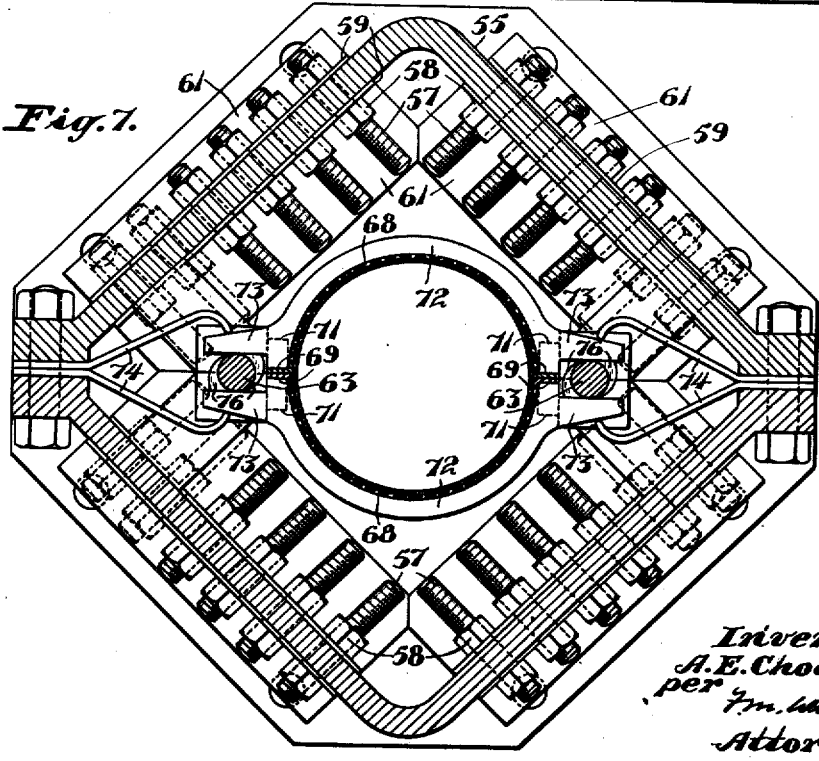
Figure 14:
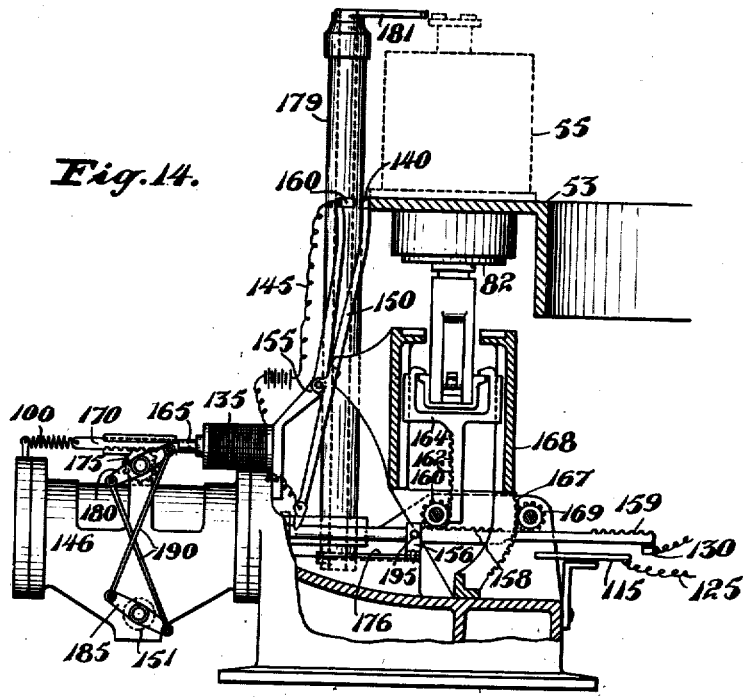
Figure 15:
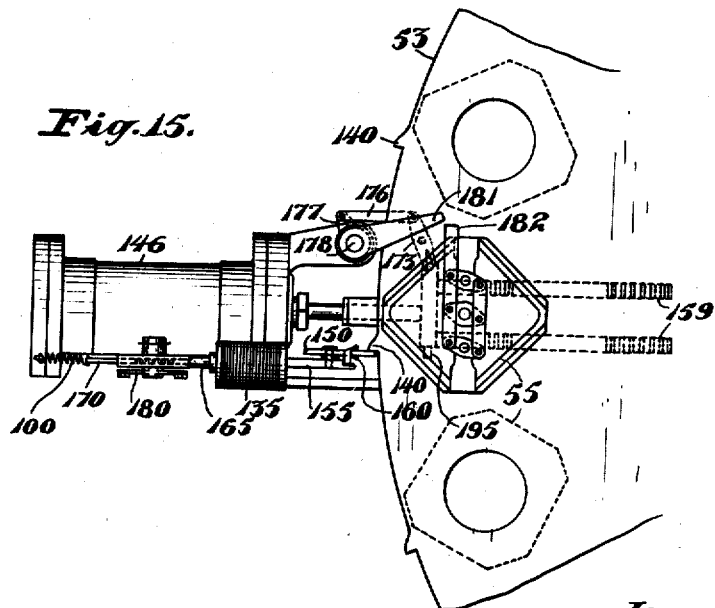

In the accompanying drawings, Figure 1 is a plan view of my improved apparatus; Fig. 2 is a vertical section on the line 2—2 of Fig. 1; Fig. 3 is a similar section on the line 3—3 of Fig. 1; Fig. 4 is an enlarged vertical section of a drying box and a mold therein; Fig. 5 is a plan view of the same; Fig. 6 is a vertical section of the same taken diagonally; Fig. 7 is a horizontal section of the same; Fig. 8 is a plan view of a casting apparatus; Fig. 9 is a horizontal section through a valve casing; Fig. 10 is a vertical section on the line 10—10 of Fig. 8, showing also a neck-piece; Fig. 11 is a vertical section on the line 11—11 of Fig. 8; Fig. 12 is a vertical section of unmolding mechanism; Fig. 13 is a broken horizontal section of the same on the line 13—13 of Fig. 12; Fig. 14 is a vertical section showing a device for operating said unmolding mechanism; Fig. 15 is a plan view of the same; Fig. 16 is an end view of water-proofing mechanism, a flexible pipe being removed; Fig. 17 is a longitudinal section of the same.

Referring to the drawings, upon a depressed annular portion 1 of a suitable foundation 2 are supported on each side of the apparatus a pair of pillars 3, and on the tops of said pillars are supported I-beams 4 extending across the top of the apparatus and connected with one another near the ends by smaller I-beams 6. On the tops of said I-beams 4 are supported cross beams 7 from which are suspended U-shaped hangers 8, which partly support a hollow annular casting 9.

Said hollow casting comprises a vertical exhaust conduit 11 having at the top a flange 12 by which it may be connected to a pipe, not shown, leading to a stack, or to mechanical means for producing suction, and conduits 13 communicating with said conduit 11 and extending horizontally in an arcuate form in opposite directions therefrom and gradually diminishing in width to closed ends, which are nearly diametrically opposite to the vertical exhaust conduit 11. It also comprises a series of horizontal conduits 14 extending radially outward from the bottoms of the conduits 11 and 13, and opening inwardly into a flanged portion 16 of said casting.

Said flanged portion 16 of the casting supports the inner side of a tunnel-shaped heating chamber 17, which is in the form of a nearly complete circle, and is surrounded at the top by heat-insulating material 18, the inner wall 19 of said chamber having an inwardly extending flange 21 secured to said flanged portion 16 of the casting 9. An outwardly extending flange 22 of its outer wall rests upon the top 23 of a burner chamber 24, which is likewise in the form of nearly a complete circle, and said burner chamber rests upon frames 26 secured partly to the depressed portion 1 of the foundation and partly to the main central portion thereof. Said burner chamber 24 is closed on the outside by a circular vertically extending plate 28, and the interior of the burner chamber is lined with asbestos 29 or similar heat-insulating material. Said asbestos 29 and the vertically extending plate 28 are formed with holes 31 to admit oil burners 32 arranged at suitable intervals in the burner chamber. Also, upwardly extending outlet passages 33 are formed in the asbestos lining and in the top 23 of the burner chamber, and communicate with passages 34 formed in the flange 22 and through the outer wall of the heating chamber.

Resting upon the main central portion of the foundation 1 is a platform 36 upon which are mounted rollers 38, upon which can roll a turn-table 39, said turn-table having a tubular portion 41 depending centrally therefrom and closely fitting around a cylindrical tubular pivot extending vertically from the platform. Said turn-table 39 is formed at the bottom outside said rollers with a bevel gear 42 which is engaged by a mutilated bevel pinion 43 on a horizontal shaft 44 rotated by any suitable source of power, not shown. Said turn-table is thus rotated intermittently. It carries a central vacuum chamber 46, having at the top a neck 47, rotatable in ball bearings 48 in the lower end of an exhaust tube 49 leading to a suction device (not shown). At the bottom said vacuum chamber communicates by four radially extending conduits 51 with an annular conduit 52, on which is supported a table 53 which rotates about the central vertical axis of the vacuum chamber, and lies closely between the outer wall of the flange 16 and the inner vertical circular wall of the burner chamber.

On said table are secured flanges 54 of a circular series of drying boxes 55, open at the bottom. These drying boxes are approximately in the form of a cube, and they are arranged with diagonal vertical planes tangential to the circle through their centers. Vertical tubes 112 on the table 53 act as baffles to cause the hot gases from the burners 32 to strike the drying boxes. In order to quickly conduct heat from the heating chamber through the walls of each drying box to the interior thereof, there extend through the side walls of the drying box pins 57 threaded at each end and secured in position in said walls by means of nuts 58 (Figs. 4 and 7). There are also secured on the exterior and interior surfaces of the box sheet metal plates 59 having sheet metal fins 61 extending outwardly and inwardly therefrom. By means of these pins, plates, and fins, large heat-radiating surfaces are obtained. Each box 55 is divided into two halves on a radially extending plane and there extend through the top of the box a short vertical stem 62 and two long vertical stems 63. The short vertical stem carries on its lower end within the box a bottom mold support 64 having a flange 66, there being secured around said flange a bottom mold 67 comprising a perforated sheet metal outer mold section and an inner mold section of close-meshed wire screen. Said mold is maintained out of contact with the support by means of a central downward projection 65 from said support. Below the bottom mold are two semi-cylindrical body mold sections 68 made of perforated sheet metal, with close-meshed wire screen supported thereby on the inside, and having flanges 69 contained between vertical bars 71 secured to, and supported by, semi-circular bars 72. Said semi-circular bars have radial extensions 73 between which the vertical stems 63 pass. Springs 74 have their outer ends secured between the flanges of the halves of the box and their inner ends press the outer surfaces of said extensions inwardly toward one another. The stems 63 have between said extensions cams 76. The upper ends of the stems 62 and 63 carry oppositely extending arms 77, 78, and the outer ends of said arms are connected with one another by links 79. By means of said links, said stems can be turned simultaneously by mechanism which will be presently described. The effect of turning of the stems 63, is, by reason of the cams 76, to cause the two semi-cylindrical body mold sections to separate from each other.

The body mold section extends downwardly nearly to the table, and through a hole in the table centrally of the box is inserted at the proper time a neck-piece 82, cylindrical in form. Said neck-piece 82 has a flange 83, which rests against the under side of the table, and it has a central hole in its bottom through which is screwed an apertured plug 84. About midway of its height, said neck-piece is formed with a central apertured web 85 and with a tube 86 extending upwardly from said web around a central hole therein. Supported by said web and tube is a sheet metal tube 87 which is bent over and extends to the web 85 where it joins with the upwardly extending short tube 86, the latter part being perforated, as shown at 90, said perforated portion having therein an annular shoulder 88. Supported upon the upper end of the neck-piece and extending to said sheet metal tube 87 is a cone 89 of perforated sheet metal. Supported by said perforated sheet metal is a sheet 91 of fine wire mesh.

The neck-piece 82 has in its side, below the web 85, a hole 92, and, above the web 85, holes 93, by which a communication is formed between the box and the outside of the neck below the table. The hole 92 can communicate with a conduit 94 which communicates past a hollow spring-pressed valve 96 with a conduit 97 leading to the vacuum chamber 46 (Fig. 9). When the neck-piece is removed, the valve is moved forward by the action of its spring 98 and communication through the valve is closed.

102 indicates a tank containing pulp or other fluid mixture of a liquid with comminuted solid material and having an extension 101. In said tank is a float 103 through the middle of which extends a tube 104, said tube opening into the tank 102 at its lower end. 106 indicates a pipe leading from a source of supply of pulp into a chamber 107, closed at the top by a plug 108 through which extends a valve stem 109. The top of said stem is secured to a yoke 111, the bottom of said yoke being secured, as shown at 112, to an annular block 113 around the tube and secured to the float and having a conical hole therethrough leading to the upper end of the pipe 104. When the level of the pulp in the tank becomes too low, the float descends and causes the valve 114 to descend, thereby permitting pulp to be supplied from the supply pipe, and to fall through the tube 104 into the tank.

Formed integral with a wall of the extension 101 is a cylinder 116 having therein a plunger 117. Pressure water is admitted to said cylinder by a conduit 118, which together with a supply conduit 119, and a discharge conduit 121, is controlled by a valve 122. Said valve 122 is controlled by a segmental gear 110 on the valve stem, and operatively engaged by a rack 115 on the core of a solenoid 120 energized by an electric circuit 125 closed by a contact 130 on the under side of a rack 159 with a stationary contact bar 135. During the complete reciprocation of the rack 159 in the manner to be presently described, the electric circuit 135 will be closed and the valve opened. When the circuit is broken, the core is retracted by a spring 105. When water is admitted into said cylinder, it raises the plunger and thereby raises the free end of a forked lever 123, pivoted at 124, said forked lever passing on each side of a tube 126, surrounding a tube 127 depending into the tank, and the sides of the lever engaging arms 128 projecting horizontally from the tube 126. The tube 126 abuts at its upper end against a rubber washer 129, which in turn presses against an annular shoulder 131 around the open upper end of the tube 127. When the tube 127 is raised by said lever, its upper conical end impinges against the conical inlet end of a suction conduit 132 leading to a valve chamber 133, from which extends upwardly a tube 134 leading centrally into the neck-piece and supported thereon by a collar 136. The suction conduit 132 communicates with said tube 134, when it is permitted to do so by a valve 137, pressed upwardly against the bottom of the tube 134 by a spring 138 coiled around a valve stem 139, the lower end of said valve stem being secured to a slotted block 141, in which can move the free end of a lever 142, pivoted at 143 upon the valve chamber, said lever being straddled by the lower end of a forked rod 144, the upper end of said rod abutting against the lower surface of the table.

When the tube 127 is raised, and thereby raises the valve chamber 133, the free end of the lever 142 is depressed, which lowers the valve 137 from the bottom of the tube 134, and causes pulp to flow into the tube 127, conduit 132 and tube 134. By reason of the lower chamber of the neck-piece being in communication with the interior of the box outside the mold through the holes 92, 93, said box outside the mold is brought to a condition of low pressure or partial vacuum and the pulp is pressed against the woven wire mesh, the water in the pulp being drawn through said mesh, while the solid contents of the pulp remain adherent to the inner surface of the mold, the perforations in which are too small to allow it to pass through with the liquid. The period during which the pulp flows into the interior of the mold is determined by the movement of the valve 122. When said valve is turned so as to close the conduit 118 to the supply conduit 119, and open it to the discharge conduit 121, the valve 137 is closed against its seat by the spring 138 and suction of the pulp or the passage of air into the interior of the mold no longer takes place.

To withdraw the neck-piece from the mold and to permit the completed bottle to fall out of the mold section, there is provided a horizontal cylinder 146, in which can reciprocate a piston 147 controlled by pressure water supplied by a conduit 148 leading to a valve chamber 149 in which is a valve 151 and connected by passages 152, 153, to the opposite ends of the cylinder 146, and also connected with an exhaust conduit 154. The piston 147 is connected to a piston rod 155 connected to a yoke 156, slidable upon a guideway 157 and each side of which has thereon two racks 158, 159, spaced apart. The rack 158 meshes with a pinion 160 on a horizontal shaft 161 and meshing with a rack 162 on a vertical rod 163 carrying a forked detacher 164 having oppositely and inwardly extending hooks 166. Said detacher slides in a guideway 168 having a rack 167 curved in a circular curve about the center of the pinion 160 as center, and engaging a pinion 169 which also engages a second rack 159. By suitable controlling mechanism, when the mold moves out of the circular tunnel, the guideway is in an upright position, and the detacher is at a height such that a yoke 171 attached to the bottom of the valve chamber passes beneath said hook. Thereupon water is admitted to the nearer end of the cylinder and the piston is moved back, causing the detacher and neck-piece to descend until the first rack 158 moves away from its co-engaging pinion.

At the same time a pin 172 carried by said yoke engages the forked end of an arm 173 pivoted on a vertical stud shaft 174, the other end of said arm being jointed to one end of a link 176, of which the other end is jointed to the outer end of an arm 177 secured to a vertical shaft 178, rotatable in bearings in a vertical tube 179 secured to an extension from the cylinder 146. From the upper end of said shaft 178 extends an arm 181, which, when the arm 173 is rocked by the movement of the pin 172.

engages an extension 182 from one of the links 79 and turns the stems 62 and 63, thus loosening the bottom mold from the bottom of the cast bottle, and separating the body sections from the body of said bottle.

The second rack 159 then moves into engagement with the pinion 169 and rotates said pinion, causing the guideway to rock upon the center of the first pinion as a pivot, until a portion 183 of said guideway rests against an end of the cylinder. Then the two sections of the body mold are moved apart by the rotation of the stems 63, and the action of the cams against the pressure of the springs, and the pulp bottle, being no longer supported, drops.

The operation of the valve 151 is controlled automatically by the rotation of the turntable in the following manner. 140 indicates a projection from the edge of the turn-table which engages the upper end of a contact lever 150 (Fig. 14) pivoted on a bracket 155 secured on an end of the solenoid 135 and carrying a contact clip 160 and thereby forcing said lever into engagement with the contact lever, and closing the circuit 145. The core 165 of said solenoid carries a rack 170 which engages a pinion 175 suitably mounted and turns said pinion and an arm 180 attached thereto, thereby turning also another arm 185 attached to the first arm by rods 190, said arm being also attached to the valve 151. The energization of said solenoid 135 thus opens the valve. When the racks are fully withdrawn a pin 195 carried by the yoke 156 engages the lower end of the lever 150 and disengages its upper end from the contact clip 160 and the circuit 145 is broken. A spring 100 then withdraws the core and closes the valve 157.

The pulp bottle is received by a chute 190 by which it is guided to one of a series of baskets 204 hereinafter described, which are provided for the purpose of holding the pulp bottles when saturating them with paraffin or other suitable liquid for the purpose of water-proofing them.

In the upper portion of a standard 184 is provided a bearing 185, in which a shaft 186 is rotated by a sprocket wheel 187 operatively connected with the turn-table to turn therewith. Said shaft 186 carries a pinion 188 which meshes with a gear wheel 189 mounted on one end of a cylinder 191 secured to a shaft 192 rotating at one end in a bearing supported upon the standard 184 and at the other end in a bearing supported upon a standard 193.

Formed integral with said cylinder is a disk 194, which carries at its outer edge a circular series of tubes 196, extending parallel with the shaft 192, each tube in turn being arranged to be brought by the rotation of the cylinder into registry with a conduit 197 in a hanger 198 depending laterally from the upper portion of the standard 184. Secured by a screw 199 in the middle portion of said yoke is a vertical tube 201 which has openings 202 communicating with the conduit 197. Said tube has in one side thereof a vertical series of holes 203 by means of which liquid can be projected from said tube against a pulp bottle supported in the wire basket 204, said baskets being secured to a rotary plate 206 rotating on ball bearings 207 supported by the tube 196, the upper end of the vertical tube 201 being formed with a downwardly extending hole 200 to cause a jet of the liquid to impinge upon the bottom of the pulp bottle which is then in an inverted position. Said plate 206 is formed with a gear wheel 209 which meshes with a pinion 211 rotating around said vertical tube 201 and formed integral with a bevel wheel 212, the latter meshing with a bevel wheel 213 upon the shaft 186. Thus by the rotation of said shaft 186, said plate 206 is also rotated. Extending through the neck of said bottle is the upper perforated end of a tube 214, around which the plate 206 rotates, said tube being secured by a screw 216 in the tube 196, and said tube 214 having openings 217 communicating with the tube 196.

With the other end of said tube 196 as it revolves around the shaft 192 is adapted to communicate a passage 218 extending from a chamber 219 supplied by a flexible pipe 221 with paraffin or other liquid to be sprayed upon the bottle, said chamber 219 being screwed, as shown at 222, to a stem 223 of a plunger 224 pressed rearwardly in a cylinder 215 by a spring 226 around said stem 223 and adapted to be pressed forwardly by means of pressure water admitted to said cylinder by a valve 227. To said valve is connected a crank arm 228, which is jointed to a link 229, which is also jointed to a crank arm 231 on a shaft 232 carrying a segment gear 233, which meshes with a rack 234 which is guided by pins 236 extending through a slot in said rack, and is operated through a roller 237 by a crown cam 238 upon an end of the cylinder 191.

A hollow valve 239 guided by an extension 241 in the passage 218 in the chamber 219 is normally pressed by a coiled spring 243 contained within the valve and compressed between the valve and the outer end of the plunger rod and normally closes said passage. But, when the plunger is pressed outward against the pressure of the coiled spring 243 by the pressure of water admitted past the valve 227, the casing of the paraffin chamber 219 is pressed against the tube 196, while the valve 239 can no longer be advanced with said chamber casing, being held back by the abutment of the guide 241 against the tube 196, and hence the valve 239 is moved from its seat, allowing the molten paraffin to flow through said seat past said guide 241 into the tube 196 and into the interior of the pulp bottle, and also through the openings 202 into the tube 201 and through the holes 203 and 200 upon the exterior and bottom of said pulp bottle.

At the same time the pulp bottle is rotated rapidly, and thus molten paraffin is applied to the whole of the interior and exterior surfaces of the pulp bottle.

Each bottle is intermittently revolved about the shaft 192, and, when in its uppermost position, is subjected to the waterproofing process above described, and when in said revolution it has reached a position in which it can slide from the basket 204, it drops on to a conveyer belt 242.

The operation of the machine is as follows:—The turn-table revolving in the direction indicated by the arrow, when a mold thereon arrives at a certain position of rest, electrical contact is made between the contacts 130 and 115, and the solenoid 120 is energized, thereby raising the tube 127 and causing pulp to flow during this position of rest into the interior of the mold and to be deposited on the inner surface of the mold. The mold then moves and stops alternately in the drying chamber, in which the pulp within the mold is thoroughly dried, and, when it arrives at another position of rest, contact is made with a conductor, energizing the solenoid 135 actuating the valve 151 and withdrawing the piston, and the two double racks actuated by the piston rod, thus withdrawing the neck from the interior of the drying box and at the same time twisting the pulp bottle from the mold, which bottle then moves by gravity to the water-proofing apparatus, where it is made water-proof, and is then delivered to the conveying belt.

I claim:—

1. In a machine for making pulp vessels, means for continuously producing a vacuum, means for continuously producing heat, and a series of molds subjected in succession to the vacuum and heat thus produced.

2. In a machine for forming pulp vessels, the combination of a continuous and closed series of molds, in which the vessels are formed, means for simultaneously moving all of said molds, and means for simultaneously casting a vessel in one mold of the series, heating other molds of the series to dry vessels therein, and unmolding the finished vessel in another mold in the series.

3. In a machine for forming pulp vessels, the combination of a continuous and closed series of molds, in which the vessels are formed, means for simultaneously moving intermittently all of said molds, and means for simultaneously casting a vessel in one mold of the series, heating other molds of the series to dry vessels therein, and unmolding the finished vessel in another mold in the series while at rest.

4. A mold for a pulp vessel comprising a bottom section, a body section in two separable halves, and a neck section, each section having numerous minute holes therethrough.

5. In a machine for making pulp vessels, a mold comprising a separable bottom mold section, and means for revolving said section relatively to the remainder of the mold.

6. In a machine for making pulp vessels, a mold comprising a bottom mold section, a stem arranged concentric therewith, the bottom mold section being revoluble on said stem, a body mold section in two separable halves and a neck mold section, removable from the drying box, for forming a tapering portion of the vessel.

7. In a device of the character described, a revolving table, a mold carried thereby for the body and bottom of a vessel, and a neck-piece for forming the neck of the vessel and movable to and from said table.

8. In a device of the character described, a movable support, a mold carried thereby for the body and bottom of a vessel, and a neck-piece for forming the neck of the vessel and movable through a hole in said support.

9. In a device of the character described, a movable support, molds carried thereby for the body and bottom of a vessel, and a neck-piece for forming the neck of the vessel and movable to and from said support.

10. In a device of the character described, a movable support, a mold carried thereby for the body and bottom of a vessel, a neck-piece, a tube therethrough to convey the pulp to the interior of the mold, conduits in the neck-piece outside the tube to conduct the liquid from the exterior of the mold, said neck-piece having a conduit leading to the vacuum chamber, and a spring-controlled valve for controlling said conduits.

11. In a device of the character described, a turn-table, a mold thereon, a tank for containing pulp or the like, means for controlling the supply of pulp to said tank, a tube depending into said tank, means actuated by the movement of said turn-table for raising said tube, and a suction conduit communicating with the interior of the mold for drawing the liquid into the mold from the tube.

12. The combination of a movable device, a series of molds carried thereby, a heating chamber in which said molds move, a heater in said heating chamber, and a conduit leading from said heating chamber and adapted to be connected with means for producing suction therein.

13. The combination of a movable device, a series of molds carried thereby, a heating chamber in which said molds move, a series of burners discharging into said heating chamber, and a conduit leading from said heating chamber and adapted to be connected with means for producing suction therein.

14. The combination of a revolving device, a circular series of molds carried thereby, a circular heating chamber in which said molds revolve, a series of burners discharging into said heating chamber, and a conduit leading from said drying chamber and adapted to be connected with means for producing suction therein.

15. The combination of a revolving device, a circular series of molds carried thereby, a circular heating chamber in which said molds revolve, a series of burners discharging into said heating chamber, a circular series of radially extending conduits communicating with said heating chamber, and a circular conduit communicating with said radial conduits.

16. The combination of a turn-table, a vacuum chamber supported thereby, a stationary pipe communicating with said vacuum chamber and adapted to be connected to a suction device, a conduit carried by said turn-table and communicating with the vacuum chamber, a table carried by said conduit, a circular series of drying boxes supported on said table, molds in the respective boxes, and means for heating said boxes as they revolve with the table.

17. The combination of a turn-table, a vacuum chamber centrally supported thereby, a stationary pipe communicating with said vacuum chamber and adapted to be connected to a suction device, an annular conduit carried by said turn-table and communicating with the vacuum chamber, a table carried by said annular conduit, a circular series of drying boxes supported on said table, molds in the respective boxes, a circular heating chamber in which said boxes revolve, and means for causing hot gases to flow in said heating chamber.

18. The combination of a turn-table, a vacuum chamber centrally supported thereby, a stationary pipe communicating with said vacuum chamber and adapted to be connected to a suction device, an annular conduit carried by said turn-table and communicating with the vacuum chamber, a table carried by said annular conduit, a circular series of drying boxes supported on said table, molds in the respective boxes, a circular heating chamber in which said boxes revolve, means for causing hot gases to flow in said heating chamber, and means for deflecting said gases against the sides of said drying boxes.

19. In a machine for making pulp vessels, a mold, a drying box inclosing the mold, a movable table to which the drying box is permanently attached, and metallic pins extending inwardly and outwardly from molds in said drying box.

20. In a machine for making pulp vessels, a mold, a drying box inclosing the mold, a movable table to which the drying box is permanently attached, and metallic pins extending inwardly and outwardly from molds in said drying box.

21. The combination of a series of drying boxes, pins extending through the walls of each drying box to transmit heat rapidly therethrough, molds in the respective boxes, and means for heating said boxes.

22. The combination of a movable device, a vacuum chamber communicating therewith, a series of drying boxes supported by said device, pins extending through the walls of each drying box to transmit heat rapidly therethrough, molds in the respective boxes, and means for drying said boxes as they move with the device.

23. The combination of a turn-table, a vacuum chamber centrally supported thereby, a stationary pipe communicating with said vacuum chamber and adapted to be connected to a suction device, an annular conduit carried by said turn-table and communicating with the vacuum chamber, a table carried by said annular conduit, a circular series of drying boxes supported on said table, pins extending through the walls of each drying box to transmit heat rapidly therethrough, molds in the respective boxes, and means for drying said boxes as they revolve with the table.

24. The combination of a series of drying boxes, sheet metal plates having portions extending both outwardly and inwardly from the walls of each drying box to transmit heat rapidly therethrough, molds in the respective boxes, and means for heating said boxes.

25. In a device of the character described, a drying box, a stem extending vertically through its top, a support carried by the lower end of said stem, and a bottom mold carried by said support, said mold comprising sheet material having a large number of small apertures therethrough.

26. In a device of the character described, a drying box, a stem extending vertically through its top, a support carried by the lower end of said stem, and a bottom mold carried by said support, said mold comprising sheet material having a large number of small apertures therethrough, and said support having a central projection to hold the main portion of said bottom mold out of contact with said support.

27. In a device of the character described, a drying box in two sections, vertical stems extending through the top of the drying box between the sections, semi-cylindrical body mold sections made of perforated metal and between which the vertical stems pass, and cams on said vertical stems for separating said body mold sections.

28. In a device of the character described, a drying box in two sections, vertical stems extending through the top of the drying box between the sections, semi-cylindrical body mold sections made of perforated metal and between which the vertical stems pass, cams on said vertical stems for separating said body mold sections, and springs for closing said sections together.

29. In a device of the character described, a drying box in two sections, vertical stems extending through the top of the drying box between the sections, semi-cylindrical body mold sections made of perforated metal and between which the vertical stems pass, cams on said vertical stems for separating said body mold sections, and means outside the drying box for turning said stems simultaneously.

30. In a device of the character described, a movable drying box in two sections, vertical stems extending through the top of the drying box between the sections, semi-cylindrical body mold sections made of perforated metal and between which the vertical stems pass, cams on said vertical stems for separating said body mold sections, and means outside the drying box and operated automatically with the movement of the box for turning said stems simultaneously.

31. In means for withdrawing a neck-piece from a mold, a cylinder, a piston therein, a rack operatively connected to said piston, a pinion meshing with said rack, a rack meshing with said pinion, and a forked detacher operatively connected with said latter rack and adapted to engage said neck-piece to withdraw it from the mold.

32. In means for withdrawing a neck-piece from a mold, a cylinder, a piston therein, a rack operatively connected to said piston, a pinion meshing with said rack, a rack meshing with said pinion, a forked detacher operatively connected with said latter rack and adapted to engage said neck-piece to withdraw it from the mold, a turn-table carrying the mold, and means operated by the movement of the turn-table for controlling the passage of fluid to said cylinder.

33. In means for withdrawing a neck-piece from a mold, a cylinder, a piston therein, racks operatively connected with said piston, pinions respectively meshing with said racks, a rack meshing with one of said pinions, a detacher operatively connected with said latter rack and adapted to engage the neck-piece and withdraw it from the mold, a rack curved about the center of the first pinion as center and meshing with the other pinion, and a guideway for said detacher moved by said curved rack.

34. In means for withdrawing a neck-piece from a mold, a hanger from the neck-piece, a cylinder, a piston therein, a rack operatively connected to said piston, a pinion meshing with said rack, a rack meshing with said pinion, and a forked detacher operatively connected with said latter rack and adapted to engage said hanger to withdraw the neck-piece from the mold.

35. In means for withdrawing a neck-piece from a mold, a hanger from the neck-piece, a cylinder, a piston therein, a rack operatively connected to said piston, a pinion meshing with said rack, a rack meshing with said pinion, a forked detacher operatively connected with said latter rack and adapted to engage the hanger and withdraw the neck-piece from the mold, a turn-table carrying the mold, and means operated by the movement of the turn-table for controlling the passage of fluid to said cylinder.

36. In combination with means for continuously forming pulp vessels, a chute into which said vessels drop when formed, and a water-proofing device to which said vessels are conducted by said chute.

37. In the process of making a pulp vessel the step which consists in passing a mold in succession through regions of low pressure and of high.

38. The process of forming a pulp vessel which consists in assembling sections of a perforated mold, drawing pulp into the interior of the mold thus formed, and the water of the pulp through said mold, and leaving the solid contents thereof on the interior of the mold, drying said mold, loosening upper sections from the vessel thus formed, and withdrawing a neck section.

39. The process of forming a pulp vessel which consists in assembling sections of a perforated mold, drawing pulp into the interior of the mold thus formed, and the water of the pulp through said mold, and leaving the solid contents thereof on the interior of the mold, drying said mold, turning a bottom mold section relatively to the vessel thus formed, separating body mold sections from each other and withdrawing a neck section.

40. The process of forming a pulp vessel which consists in assembling sections of a perforated mold, drawing pulp into the interior of the mold thus formed, and the water of the pulp through said mold, and leaving the solid contents thereof on the interior of the mold, drying said mold, turning a bottom mold section relatively to the vessel thus formed, separating body mold sections from each other and withdrawing a neck section, thereby permitting the vessel to fall by gravity, conducting said vessel to a suitable location, and spraying water-proofing material on the inner and outer surfaces of said vessel.

41. The process of forming a pulp vessel which consists in assembling sections of a perforated mold, drawing pulp into the interior of the mold thus formed, and the water of the pulp through said mold, and leaving the solid contents thereof on the interior of the mold, causing products of combustion to flow in proximity to said mold but maintaining said products out of contact therewith, turning a bottom mold section relatively to the vessel thus formed, separating body mold sections from each other and withdrawing a neck section, thereby permitting the vessel to fall by gravity, conducting said vessel to a suitable location, and spraying water-proofing material on the inner and outer surfaces of said vessel.

ADAM E. CHODZKO.